Dec. 16, 1952 W. VAN GUILDER 2,621,906
BEATER ATTACHMENT
Filed Jan. 27, 1950 2 SHEETS—SHEET 1
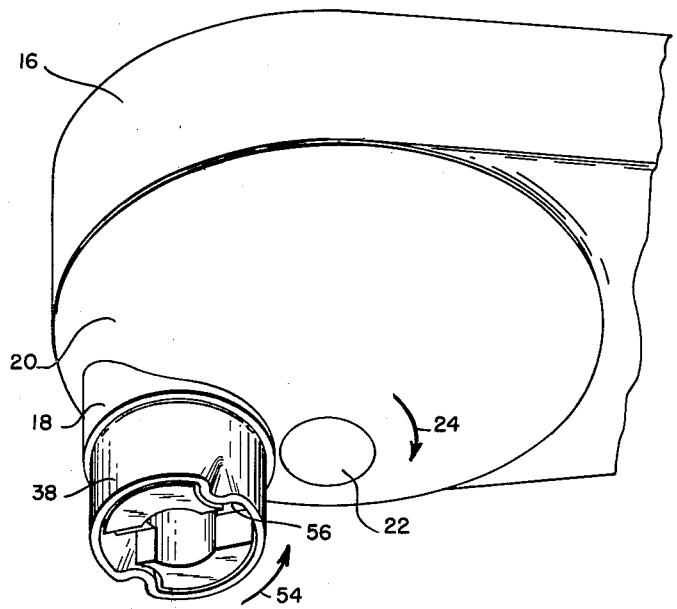
FIG. 1
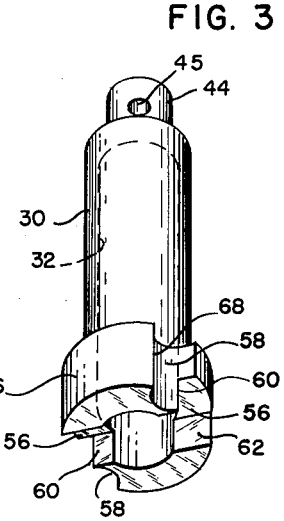
FIG. 3
FIG. 8
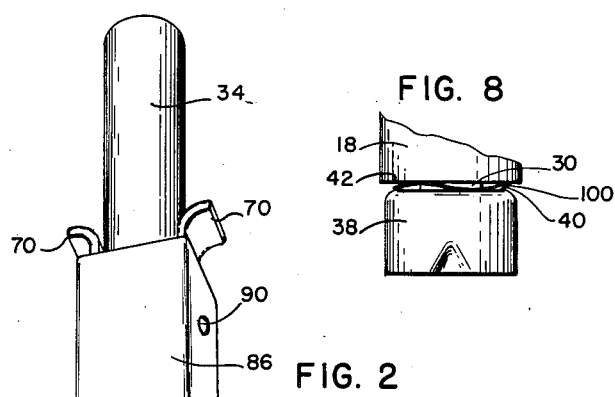
FIG. 2
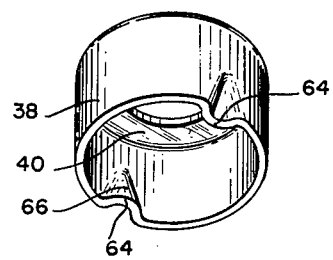
FIG. 4
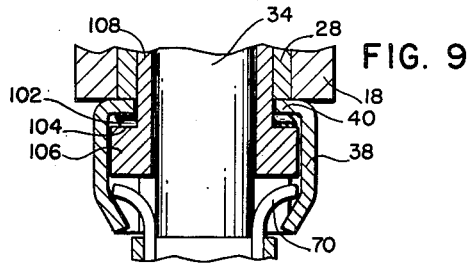
FIG. 9
INVENTOR
WALTER VAN GUILDER
BY William C. Babcock
ATTORNEY

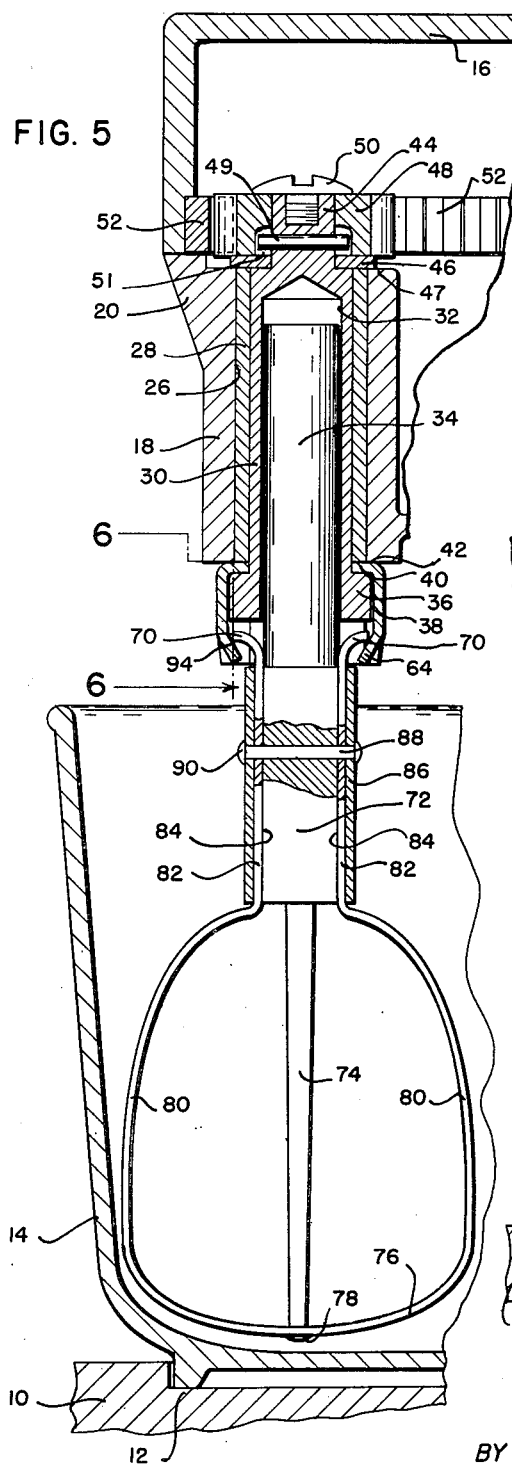
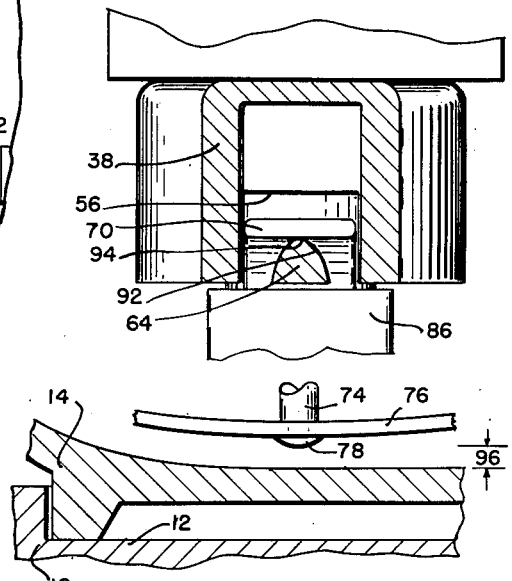
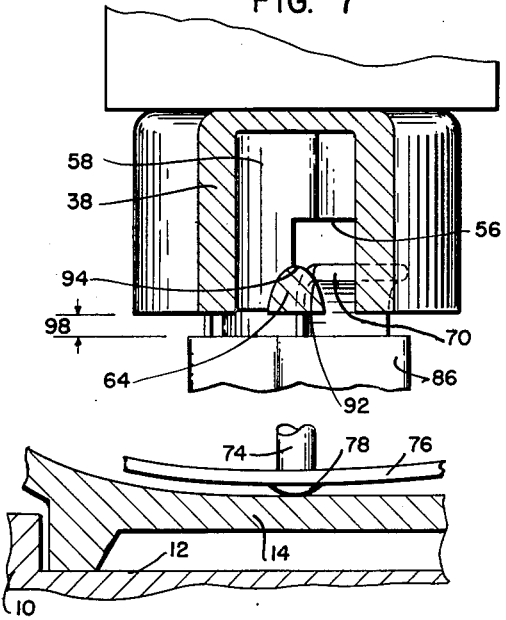

Patented Dec. 16, 1952

2,621,906

UNITED STATES PATENT OFFICE 2,621,906

BEATER ATTACHMENT

Walter Van Guilder, River Forest, Ill., assignor to General Mills, Inc., a corporation of Delaware Application January 27, 1950, Serial No. 140,777

16 Claims. (Cl. 259—129)

1

The present invention is concerned with food mixers and more particularly with an improved mixer drive unit and beater assembly.

Numerous constructions have been proposed in the past for removable attachment of a beater assembly to the driving shaft of a household or similar food mixer. Some of these attachments involve the use of a spring ring or resilient clamp, while others utilize a bayonet slot. With some of these devices it has been found necessary to provide a separate ejector or release element to facilitate removal of the beater from the drive shaft.

It is one object of the present invention to provide an improved food mixer construction in which a beater assembly is removably attached to a drive shaft.

It is a further object to provide a beater clamp which is mounted on the drive shaft in an improved manner facilitating ready assembly of the parts.

Another object is the provision of a beater clamp mounted on the end of a suitable drive shaft and having frictional engagement with a portion of the bearing member supporting the shaft, for automatic rotation of the clamp to locking position in response to operation of the beater.

A further object is the provision of an improved heater assembly in which one of the beater loops or elements is provided with a projecting end for engagement with the drive shaft and beater clamp.

Other objects and advantages of the present invention will be apparent from the following specification in which a preferred embodiment has been shown and described with particular reference to the accompanying drawings. In these drawings, wherein like reference characters indicate like parts, Figure 1 is a partial perspective view, taken from below, of one end of a suitable mixer drive unit or gear casing.

Fig. 2 is a perspective view of a portion of a beater assembly for engagement with the drive shaft of the mixer unit.

Fig. 3 is a perspective view of the drive shaft of the unit.

Fig. 4 is a perspective view of the beater clamp designed for assembly with the drive shaft.

Fig. 5 is a partial side elevation, with certain portions shown in section and other portions broken away for the sake of clearness, showing the beater assembly and drive unit in operative position with respect to a mixing bowl and bowl support.

2

Fig. 6 is a compressed sectional view on the line 6—6 of Fig. 5, showing the beater attachment elements in closed and locked position.

Fig. 7 is a view similar to Fig. 6 but with the beater clamp and elements in unlocked or released position.

Fig. 8 is a partial view of a modified assembly according to the invention, and

Fig. 9 is a partial sectional view of still another modification.

As shown in Fig. 5, my improvements have been incorporated in a food mixer of the usual household type which includes a base or support 10. The base 10 has a recess 12 in which a mixing bowl 14 may be removably supported. A mixer drive unit designated generally at 16 is mounted above the support 10 and mixing bowl 14 and is movable from the operating position of Fig. 5 upwardly to a position (not shown) in which the beater assembly to be described may be readily inserted in and removed from the drive unit. Since the supporting connections between the drive unit 16 and the base 10, which permit such tilting or upward removal of the drive unit, are old and well known in the food mixer art, these connections have been omitted for clearness.

Mounted on the mixer drive unit 16 is a bearing member 18. In the form shown, bearing member 18 is provided as an integral portion of a rotating planetary mixing head 20. This planetary head 20 is fixed to a central shaft 22 (Fig. 1) which may be rotated in the direction of arrow 24 by any of the usual forms of driving mechanism. It will be readily understood by those familiar with the food mixer art that the mixer drive unit 16, and particularly the shaft 22, may be suitably driven through gearing or other connections by a motor or power unit (not shown) forming a part of the complete food mixer assembly.

The bearing member 18 is provided with a vertical bearing passage 26. A cylindrical liner or bushing 28 of suitable bearing material may be fixed within the bearing passage 26.

A beater drive shaft 30 is rotatably mounted within the bushing 28 and bearing member 18. This drive shaft 30 has an axial recess 32 opening at its lower end for reception of the driven end 34 of a beater assembly shaft.

At its lower end, the drive shaft 30 is also provided with an outwardly projecting extension or annular shoulder 36. Mounted on this shoulder for limited rotation with respect to it is a cylindrical beater clamp 38. Beater clamp 38, at its upper end, has an inwardly projecting flange 40 which prevents downward removal of the beater clamp 38 from shoulder 36. This flange 40 is frictionally engaged between the shoulder 36 of drive shaft 30 and the lower surface 42 of the bearing member 18. Thus, when the drive shaft 30 is rotated, the frictional engagement between the flange 40 and surface 42 of the bearing member 18 will tend to cause relative rotation of the clamp 38 on shoulder 36 to the locking or beater element retaining position of the clamp which is described below.

At its upper end, the drive shaft 30 is provided with an extension 44 of reduced diameter. A locking collar 46 is mounted on this reduced extension 44 and has a diameter greater than that of the remainder of shaft 30 or of bushing 28 or bearing passage 26, in order that the collar 46 may overlap the joint between these portions and may engage the upper surface 47 of the bearing member to prevent downward removal of the drive shaft 30. A drive gear or pinion 48 is also mounted on the reduced extension 44 of drive shaft 30 and is keyed to the shaft by a suitable pin 49 extending through the cross bore 45 (Fig. 3) of the extension 44 into a suitable key slot 51 of the pinion. A cap screw 50 is threaded into the upper end of the extension 44 and retains the gear 48 and collar 46 in assembled position.

In the planetary construction shown by way of example, the drive pinion 48 engages a fixed internally toothed ring gear 52 which is rigidly mounted in the frame of the drive unit 16. Thus as the planetary head 20 is rotated on its shaft 22 in the direction of arrow 24 (Fig. 1), the engagement between the drive pinion 48 and fixed ring gear 52 will cause rotation of drive shaft 30 in the direction of arrow 54 of Fig. 1.

In order to provide a removable driving connection for the beater assembly, the lower face of the shoulder 36 of drive shaft 30 is provided with at least one radial slot 56 (Fig. 3). In the particular example shown, two of these radial slots 56 have been provided at diametrically opposite points on the lower surface of the shoulder 36 so that in effect a single diametrical slot has been provided. I prefer this double radial slot arrangement in order that the beater assembly may be driven and supported from two diametrically opposed points.

At one edge of each radial slot 56, the shoulder 36 is provided with an axial recess 58 which intersects the edge of the slot 56 at 60. The opposite edge 62 of the slot 56 extends without interruption through the full thickness of the annular shoulder 36, whereas the edge 60 of slot 56, by reason of the intersection of the slot with recess 58, extends only through the inner portion of the thickness of the shoulder 36.

The beater clamp 38 is provided with a retaining portion 64 for cooperation with each recess 58 and slot 56. As shown in Fig. 4, the retaining portion 64 may be in the form of a projection struck inwardly from the wall of the clamp 38 so that the inner surface 66 of the projection is substantially conical and tapers inwardly both from each side and also inwardly and downwardly from the top of the deformed portion as illustrated.

The retaining portion 64 is designed to fit the axial recess 58 of the shoulder 36 on drive shaft 30. By relative rotation of the beater clamp 38 on the shoulder 36, this retaining portion 64 may be moved from one limiting position in which it engages the edge 68 of the recess 58, to a second limiting position in which it engages the opposite edge 62 of the radial slot 56. In this position the retaining portion 64 will lie beneath the slot and will thus hold the laterally extending locking projections 70 of the beater assembly described below so that these projections 70 are kept in the slots 56 to prevent downward removal of the beater assembly. When the retaining portions 64, on the other hand, are aligned with the axial recesses 58, the slots 56 are entirely open so that the locking projections 70 are freely removable from the slots.

It should be noted that the axial recesses 58 in the shoulder 36 make possible the convenient assembly of the drive shaft 30 and beater clamp 38. Thus the clamp 38 of Fig. 4 is initially telescoped downwardly over the top of the beater drive shaft 30 of Fig. 3. Since the downwardly projecting flange 40 of the beater clamp fits around the main shaft portion 30, and since the upper portion of the shaft is no larger in diameter than the main shaft portion 30 (but is in fact reduced in diameter as at 44) this telescoping assembly of the parts is made possible. As the beater clamp 38 is moved toward the bottom of shaft 30, the clamp may be rotated until the retaining portions 64 are in alignment with the axial recesses 58, and the clamp 38 may then be moved all the way downwardly to the completely assembled position.

Next, the assembled drive shaft and beater clamp can be inserted from the bottom into the bearing member 18 and bushing 28. With these parts in the assembled position of Fig. 5, the retaining collar 46, drive gear 48, pin 49, and locking screw 50 may be placed in position to retain the parts as shown in the drawing.

The beater assembly itself includes the beater shaft 34, the driven end of which is of circular cross section designed to telescope upwardly within the recess 32 of drive shaft 30. Next to this driven end of shaft 34, the shaft is provided with a portion of rectangular cross section indicated at 72. The lower or free end of the beater shaft is reduced in diameter as indicated at 74. One or more beater loops or elements 76 may be mounted on the beater shaft. In the drawing a single beater loop 76 has been shown which is fastened at its midpoint to the free end of the shaft portion 74 by riveting over the end of the shaft as indicated at 78. The portions of the element 76 adjacent the midpoint are bent outwardly and upwardly to form beater loops indicated at 80. The portions 82 of these loops near the free ends of the element 76 are flattened against opposite faces 84 of the rectangular section 72 of the beater shaft. A rectangular sleeve 86 is provided to surround the flattened beater portions 82 and clamp them firmly against the surfaces 84. A retaining pin 88 is passed through the collar 86, beater elements 82, and shaft portion 72 to retain the parts in assembled position. The ends of the pin 88 may be riveted as at 90 to hold the pin in position.

It will be understood that in the assembly of this beater unit, the beater element 76 with its loops 80 will first be formed of substantially flat strip material bent to the desired shape. Portions 82 will then be inserted within the rectangular collar 86. After this, the shaft portions 72 and 74 will be telescoped downwardly into the assembled beater loop and collar until the lower end of the shaft can be riveted to the beater loop at 78. Retaining pin 88 will then be inserted to complete the assembly.

One of the features of the present invention is the use of the ends 70 of the beater loop element 76 as a laterally extending locking projection for driving engagement with the slot 56 of the beater drive shaft. These locking projections 70 are engaged not only by the edges of the radial slots 56 to key the beater assembly to the drive shaft 30 and insure rotation of the beater assembly with the shaft, but are also locked against axial withdrawal from the drive unit by means of the retaining portions 64 of the beater clamp 38. Thus, all that is necessary to remove the beater assembly and shaft from the assembled position of Fig. 5, is a simple manual rotation of the clamp 38 to the position shown in Fig. 1 in which the retaining portions are aligned with the axial recesses 58 of the shaft shoulder. In this relative position of the clamp 38 and shoulder 36, the drive slots 56 are entirely open so that the upper end of the beater shaft as shown in Fig. 2 may be readily inserted in or removed from the drive unit. After the beater assembly has been placed in operative position, it is only necessary to rotate the clamp 38 to its other position so that the retaining portions 64 are aligned with the slots 56 and lie beneath the locking projections 70 of the beater assembly.

Should the operator forget to rotate the beater clamp to this locked position, the frictional engagement between the beater clamp 38 and the bearing member 18 will automatically cause rotation of the clamp to this locked position when the drive shaft 30 begins to turn. Thus a very convenient beater attachment means has been provided which can be readily manipulated for removal of the beater and which will automatically lock the beater in position in case the operator forgets to perform the necessary locking action.

Figs. 6 and 7 illustrate further the manner in which this automatic locking action takes place and provides the necessary clearance between the bottom of the beater unit and the surface of the mixing bowl.

As indicated above, the retaining portions 64 are substantially conical in section. Thus a section taken on the vertical plane 6—6 of Fig. 5, as shown in Figs. 6 and 7, will intersect these retaining portions 64 in a substantially hyperbolic surface 92. When the beater assembly is in fully clamped and locked position, the locking projections 70 will be supported at the uppermost point 94 of this section (since the section in question has been taken exactly at the point where the extensions 70 engage the members 64).

In this position, the lower end 78 of the beater assembly is spaced slightly above the bottom of the bowl 14 by a distance indicated between the arrows at 96 of Fig. 6. Thus the necessary clearance is provided to prevent frictional engagement between the beater element and the bowl itself.

Fig. 7 illustrates the situation when the beater clamp 38 is in unlocked position and the beater shaft 34 has been inserted within the drive shaft recess 32, but the lower end of the beater shaft 78 is still resting on the bowl 14 due to the failure to rotate the clamping member 38 to locking position. In this case, since the beater and bowl are in engagement, it is apparent that the locking projections 70 and the rectangular collar 86 of the beater assembly will be spaced below their normal assembled positions by a distance 98 which is identical to the normal clearance distance 96 of Fig. 6 between the bottom of the beater and the bowl when the beater is in locked operating position. In this position of Fig. 7, the edge of the locking projection 70 will engage the sloping inner surface 92 of the locking projection 64. This sloping surface acts as a cam to lift the locking projection 70 and thereby lift the beater assembly from the position of Fig. 7 to the position of Fig. 6 as the beater clamp 38 is rotated from the unlocked position of Fig. 7 to the locked position of Fig. 6. This camming or lifting action to raise the beater so that it will clear the bowl will take place either as the result of manual rotation of the beater clamp 38, or as the result of automatic rotation of the clamp 38 in response to frictional engagement between the clamp and the bearing member 18 as already described, in the event the operator forgets to move the clamp manually. Thus, even if the simple operation of rotating the beater clamp is forgotten, a construction has been provided in which the initial rotation of the drive shaft will cause relative rotation between the clamp and the drive shaft and will lift the beater assembly so that it clears the bowl and is locked firmly in driving engagement with the shaft.

In Fig. 8, a modified construction is shown in which a spring washer 100 is mounted on shaft 30 between the bearing member 18 and the clamp 38. This spring washer is frictionally engaged between the lower surface 42 of bearing member 18 and the upper surface of flange 40 on clamp 38. Thus the friction necessary for automatic locking action of clamp 38 is provided while, at the same time, the resilience of the washer 100 takes care of small variations in dimensions of the drive shaft 30 and its associated parts during manufacture. Thus reasonable production tolerances in these dimensions may be permitted without adverse effect on the shaft and bearing assembly.

In Fig. 9, still another modification is shown. In this case the parts are substantially similar to those in Fig. 8, except that the spring friction washer 102 is located inside of the beater clamp 38, between the lower surface of beater clamp flange 40, and the upper surface 104 of shoulder 106 on beater drive shaft 108. The spring washer holds beater clamp 38 up against bearing member 18, so that the clamp will be held back, on rotation of drive shaft 108 and will thus be moved to and held in locking position. As in the case of Fig. 8, the resilience of the washer provides the necessary manufacturing tolerances.

From the foregoing description, it is apparent that a construction has been provided which accomplishes the objects of the present invention and which avoids various defects of the prior art construction. Since minor variations and changes in the exact details of construction will be apparent to persons skilled in this field, it is intended that this invention shall cover all such changes and modifications as fall within the spirit and scope of the attached claims.

I claim as my invention:

1. A mixer drive unit comprising a bearing member having a vertical bearing passage therein, a beater drive shaft rotatably mounted in the bearing passage and having an annular shoulder at its lower end, a substantially cylindrical beater clamp rotatably and coaxially mounted on the shoulder and having an upper inwardly extending flange frictionally engaged between the shoulder and the lower surface of the bearing member, and a retaining member removably mounted on the top of the shaft and engaging the upper surface of the bearing member to hold the parts in assembled position.

2. A mixer unit according to claim 1 in which the removable retaining member comprises a gear of greater diameter than the shaft.

3. A mixer drive unit comprising a bearing member having a vertical bearing passage therein, a beater drive shaft rotatably mounted in the bearing passage and having an annular shoulder at its lower end, a substantially cylindrical beater clamp rotatably and coaxially mounted on the shoulder and having an upper inwardly extending flange frictionally engaged between the shoulder and the lower surface of the bearing member, a retaining member removably mounted on the top of the shaft and engaging the upper surface of the bearing member to hold the parts in assembled position, and cooperating means on the shoulder and clamp for removable attachment of a beater element to the shaft in response to limited relative rotation of the clamp and shaft.

4. A mixer drive unit comprising a bearing member having a vertical bearing passage therein, a beater drive shaft rotatably mounted in the bearing passage and having an annular shoulder at its lower end, a substantially cylindrical beater clamp rotatably and coaxially mounted on the shoulder and having an upper inwardly extending flange frictionally engaged between the shoulder and the lower surface of the bearing member, a retaining member removably mounted on the top of the shaft and engaging the upper surface of the bearing member to hold the parts in assembled position, the shoulder having a radial slot in its lower surface and an axial recess in its periphery intersecting one edge of the slot, and the clamp having an inner projection on its lower periphery extending into the lower end of the recess and relatively rotatable between the recess and the opposite edge of the slot.

5. A mixer drive unit comprising a bearing member having a bearing passage therein, a drive shaft rotatably mounted in the bearing passage and having an annular shoulder at one end, a clamp rotatably and coaxially mounted on the shoulder and having a flange extending inwardly between the shoulder and the end of the bearing, cooperating means on the shoulder and clamp for removable attachment of a food handling element to the shaft in response to limited relative rotation of the clamp in the opposite direction from the direction of rotation of the shaft, and means providing frictional engagement between the clamp flange and bearing member for automatic relative rotation of the clamp when the shaft is rotated.

6. A mixer drive unit comprising a bearing member having a bearing passage therein, a drive shaft rotatably mounted in the bearing passage and having an annular shoulder at one end, a clamp rotatably mounted on the shoulder, cooperating means on the shoulder and clamp for removable attachment of a food handling element to the shaft in response to limited relative rotation of the clamp in the opposite direction from the direction of rotation of the shaft, and means providing frictional engagement between the clamp and bearing member for automatic relative rotation of the clamp when the shaft is rotated.

7. A mixer drive unit comprising a bearing having a drive shaft rotatably mounted therein for normal rotation in one direction during operation, a clamp rotatably mounted on the shaft at one end of the bearing for limited relative rotation between predetermined locking and unlocking positions which are angularly spaced around the shaft less than one complete revolution apart, cooperating means on the clamp and shaft retaining a food handling element in driving engagement with the shaft when the clamp is in locking position and permitting removal and insertion of the element when the clamp is in unlocking position, the direction of relative rotation of the clamp from unlocking to locking position being opposite to the direction of normal rotation of the shaft.

8. A mixer drive unit according to claim 7 in which the cooperating retaining means on the clamp and shaft include axially inclined cam surfaces engaging the food handling element and causing axial movement of the element toward the bearing in response to relative rotation of the clamp to locking position.

9. A mixer drive unit comprising a bearing having a drive shaft rotatably mounted therein, a clamp mounted on the shaft at one end of the bearing for limited relative rotation through less than one complete revolution between locking and unlocking positions, cooperating means on the clamp and shaft retaining a food handling element in driving engagement with the shaft when the clamp is in locking position and permitting removal and insertion of the element when the clamp is in unlocking position, the direction of relative rotation of the clamp from unlocking to locking position being opposite to the direction of normal rotation of the shaft, and means on the unit frictionally engaging the clamp and resisting normal rotation of the clamp with the shaft thereby providing for automatic relative rotation of the clamp to locking position in response to normal rotation of the shaft.

10. A mixer drive unit according to claim 9 in which the cooperating retaining means includes an axially inclined cam surface urging the food handling element axially toward the clamp and bearing in response to relative rotation of the clamp to locking position.

11. A beater assembly for removable coaxial attachment to a beater drive shaft having a radial driving portion, said beater assembly comprising a rotatable beater shaft having means at one end for coaxial engagement with the drive shaft, and a beater loop having one portion fastened to the other end of the beater shaft and a second portion secured at a spaced point on said shaft, the loop having a free end extending beyond the second portion, said free end projecting radially from the shaft and providing a shoulder for engagement by the radial driving portion of the beater drive shaft.

12. A beater assembly for removable coaxial attachment to a beater drive shaft having a radial driving portion, said beater assembly comprising a rotatable beater shaft having means at one end for coaxial engagement with the drive shaft and also having a portion of rectangular cross section near the driven end of the shaft, and a beater loop of flat material having its mid-point fastened to the free opposite end of the beater shaft and having the portions adjacent its ends secured flatwise against opposite sides of said rectangular shaft portion, the free ends of the loop projecting radially outwardly from the shaft and providing a shoulder for engagement by the radial driving portion of the beater drive shaft.

13. In a food mixer having a support for a mixing bowl, a mixer drive unit mounted above the support and movable vertically away from the support for attachment and removal of a beater assembly, and a beater assembly comprising a rotatable beater shaft, a beater element thereon and a lateral locking projection near the driven end of the beater shaft, the improvement comprising a bearing member in said drive unit having a vertical bearing passage therein, a drive shaft rotatably mounted in the passage and having an axial recess in which the driven end of the beater shaft is removably engaged and a radial slot in the lower face of the drive shaft into which the locking projection may extend, and a beater clamp rotatably mounted on the drive shaft and having a retaining portion relatively rotatable between a locking position below the slot and locking projection and an open position at one edge of the slot, the beater clamp having frictional engagement with the bearing member urging the retaining portion to its relative locking position in response to rotation of the drive shaft.

14. A food mixer according to claim 13 in which the beater clamp has an axially inclined cam surface engaging and lifting the locking projection in response to rotation of the beater clamp to its relative locking position when the drive unit is in operative position above the support with the beater shaft extending into the drive shaft recess and supported by the bottom inner surface of a bowl on the support.

15. A food mixer according to claim 13 in which said retaining portion and locking projection have interengaging surfaces, at least one of which comprises an axially inclined cam portion for lifting the locking projection in response to rotation of the beater clamp to its relative locking position when the drive unit is in operative position above the support with the beater shaft extending into the drive shaft recess and supported by the bottom inner surface of a bowl on the support.

16. A mixer drive unit comprising a bearing having a drive shaft rotatably mounted therein, a clamp mounted on the shaft at one end of the bearing for relative rotation between locking and unlocking positions, cooperating means on the clamp and shaft retaining a food handling element in driving engagement with the shaft when the clamp is in locking position and permitting removal and insertion of the element when the clamp is in unlocking position, the direction of relative rotation of the clamp from unlocking to locking position being opposite to the direction of normal rotation of the shaft, and means frictionally engaging the clamp for automatic relative rotation of the latter to locking position in response to normal rotation of the shaft, said frictional engaging means comprising a spring washer resiliently engaged between the bearing and clamp.

WALTER VAN GUILDER.

REFERENCES CITED

The following references are of record in the file of this patent:

UNITED STATES PATENTS

| Number | Name | Date |
| --- | --- | --- |
| 609,478 | Sturgis | Aug. 23, 1898 |
| 797,638 | Thomas | Aug. 22, 1905 |
| 1,792,363 | Dehuff | Feb. 10, 1931 |
| 1,818,261 | Kock et al. | Aug. 11, 1931 |
| 2,013,887 | Jeppsson | Sept. 10, 1935 |
| 2,161,867 | Kessel | June 13, 1939 |